United States Patent [19]

Stankos

[11] 4,205,897
[45] Jun. 3, 1980

[54] FIBER OPTIC CONNECTOR FOR SINGLE FIBER

[75] Inventor: William C. Stankos, Melbourne, Fla.

[73] Assignee: Harris Corporation, Cleveland, Ohio

[21] Appl. No.: 788,768

[22] Filed: Apr. 19, 1977

[51] Int. Cl.² .............................................. G02B 5/14
[52] U.S. Cl. .................................................. 350/96.21
[58] Field of Search ............... 350/96.20, 96.21, 96.22

[56] References Cited

U.S. PATENT DOCUMENTS

| | | | |
|---|---|---|---|
| 3,455,625 | 7/1969 | Brumley et al. | 350/96.22 |
| 4,008,948 | 2/1977 | Dalgleish | 350/96.21 |
| 4,009,931 | 3/1977 | Malsby et al. | 350/96.22 |
| 4,023,886 | 5/1977 | Nakayama et al. | 350/96.21 |
| 4,026,972 | 5/1977 | Phillips et al. | 350/96.20 X |
| 4,061,577 | 12/1977 | Bell | 350/96.21 X |

FOREIGN PATENT DOCUMENTS 2529352  1/1976  Fed. Rep. of Germany ........ 350/96.21
2273289 12/1975  France ................................ 350/96.21

OTHER PUBLICATIONS

M. A. Bedgood et al., "Demountable Connectors for Optical Fiber Systems," Electrical Communication, vol. 51, No. 2, Feb. 1976, pp. 85-91.

*Primary Examiner*—Rolf G. Hille
*Attorney, Agent, or Firm*—Craig & Antonelli

[57] ABSTRACT

A connector and coupling assembly to couple a single pair of optical fibers provides for securing the respective fibers in identical metallic connector pins and inserting these pins in an alignment sleeve having a precision axial aperture which maintains proper alignment of the pins and the fibers carried thereby. The respective connector pins are carried by coupling members which resiliently hold the pins so as to allow alignment thereof by the alignment sleeve while the coupling members provide for axial clamping of the pins together in axial alignment.

32 Claims, 5 Drawing Figures

FIBER OPTIC CONNECTOR FOR SINGLE FIBER

BACKGROUND OF THE INVENTION

The present invention relates in general to connectors and couplers for optical fibers, and more specifically, to connectors and couplers of extremely simple construction which are effective to accurately align and couple individual pairs of optical fibers.

Recently, significant research and development has been extended into the field of optical communication systems, including, but not limited to telephony, data processing, television, and various control applications. The great interest in the use of optical fibers for various communication applications results from the very high available band width, immunity from electro-magnetic interference, communication security, small size, low weight and lack of need for strategic materials. However, the need to efficiently couple such optical fibers, which can be a serious problem due to the extremely small dimensions thereof, provides a serious limitation on the use of such communication waveguides. Thus, connectors and couplers for optical fibers are an important aspect of an effective optical communication system in that they have a direct bearing on the degree of optical losses and the relative ease of installation and maintenance of the system in the field.

Connectors and couplers for optical fibers fall generally into two classes. In a first class, a single coupler is used to interconnect an entire bundle of optical fiber strands. A second class provides a separate coupler to interconnect each single pair of fiber strands. With respect at least to optical communications over substantial distances, the trend has been to employ the single fiber and single fiber connector concepts, primarily because of economic and loss considerations.

In addition, the single optical fiber strand-to-strand connectors and couplers of the prior art have been of generally large size so that use of such couplers in a multi-strand cable of large size may be difficult, if not impossible. One such prior art connector and coupler arrangement is disclosed in U.S. Pat. No. 3,914,880, issued to Dakss et al on Oct. 28, 1975. In the patented arrangement, the end of each optical fiber to be joined is attached within a glass capillary and each glass capillary is inserted into a hollow hard metal plug whose outer surface is ground to a precision diameter. The two metal plugs are then placed in face-to-face relationship in a precision ground V groove formed in a rigid block and are held in place by respective clamping arrangements in which holding screws contact the respective metal plugs and hold them forcefully within the groove so as to maintain alignment between the connectors by virtue of the precision V groove and the precision ground diameter of the respective metal plugs.

The structural arrangement of the connector and coupler combination disclosed in the above-referenced Dakss et al patent clearly is of undesirably large size and of complicated construction rendering it generally undesirable for use in coupling optical fiber strands in a multistrand cable. In addition, the proper alignment between the respective connectors depends in the patented coupler arrangement solely upon the effectiveness of the clamping arrangement associated with the support block in which is provided the precision ground V groove, the respective connectors being held in position on the V groove by separate clamping arrangements. Thus, a loosening of either clamping arrangement during use for any reason can result in a misalignment or uncoupling of the fibers.

SUMMARY OF THE INVENTION

An object of the invention is to provide an improved fiber-to-fiber connector and coupler arrangement that can be mated and unmated under normal uses without mechanical failure.

A further object of the present invention is to provide a connector and coupler arrangement of the type described in which coupling and alignment of a pair of optical fibers can be maintained consistently with an insertion loss of less than about 1.5 db without the need for matching or coupling oil.

An additional object of the invention is to provide an improved single fiber connector and coupling arrangement that is economical to fabricate, easy to assemble, and has the inherent ability to provide for easy change of the ends of the fibers to maintain minimum loss in communication transmission.

Further, an object of the invention is to provide an improved single fiber connector that is compatible for use with fibers which are either polished or cut.

A still additional object of the invention is to provide a single fiber connector in which the fiber ends are in firm but resilient contact so that low coupling losses are present without subjecting the fiber ends to undue stress.

In accordance with the present invention, an assembly for connecting the stripped ends of a pair of single optical fibers includes a pair of connector halves each comprising a connector pin made of a rigid material having a circular cross section and being formed with an axially concentric precision circular aperture extending throughout the length of the pin, the aperture being shaped and sized so as to permit the stripped end of one of the single optical fibers to be snugly positioned and bonded within the aperture so that the fiber end and one pin end are substantially coextensive. In order to couple the respective ends of the pair of optical fibers, the respective connector pins are placed in juxtaposed position with the ends thereof in contact and a rigid adapter tube or alignment sleeve is disposed around the pair of connector pins so as to enclose the junction thereof and the portions thereof on either side, the aperture of the rigid tube being shaped and sized so as to hold the connector pins in close axial alignment.

According to the present invention, a rigid shell encloses a portion of each connector pin and extends beyond the other end of the connector pin. A quantity of flexible adhesive material is disposed in at least a portion of the region between the connector pin and the rigid shell for permitting slight movement of the pin with respect to the shell. Coupling means is secured to the rigid shell of both connector halves for drawing the connector pins into pressure contact, the flexible adhesive material providing a spring bias so that a resilient support of the connector pins in intimate contact with one another is maintained. The adhesive material advantageously has an elastic limit which releases the bond between the shell and connector pin when excessive forces are generated, thereby minimizing damage to the assembly. A flexible tube having a high tensile strength and low modulus of elasticity is tightly disposed over the back end of the rigid shell and around the unstripped fiber portion.

These and other objects, features, and advantages of the present invention will become more apparent from the following detailed description, when taken in conjunction with the accompanying drawings.

DETAILED DESCRIPTION OF THE PREFERRED EMBODIMENTS

Figure 1:
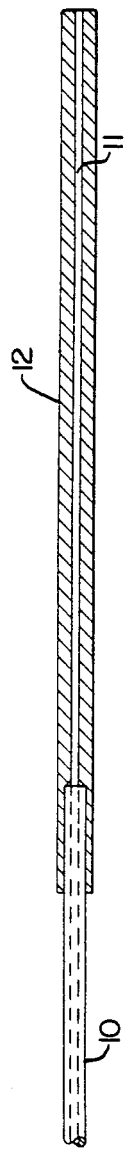
FIG. 1 is a longitudinal sectional view of the fiber optical connector in accordance with the present invention.

In referring to the several figures of the drawing, like reference numerals are used to refer to identical parts of the articles described.

The basic connector element in accordance with the present invention is illustrated in FIG. 1 in the form of a connector pin 12 of generally cylindrical configuration made of rigid material, such as stainless steel, and being formed with an axially concentric precision circular aperture extending throughout the length of the pin. The aperture in one end of the pin is formed with an enlarged opening extending a short distance from the end. A single fiber optic strand 10 having a portion of its protective jacket stripped is then inserted into the enlarged aperture of the connector pin so that the junction of the stripped and unstripped portion of the fiber is pressed against the seat formed by the transition between the large and small diameter portions of the connector pin aperture. In this regard, the fiber 10 is stripped of its protective jacket along the length of the strand for a distance which will permit the bare fiber 11 to extend through the entire length of the aperture in the connector pin 12 and protrude slightly from the opposite end 12' thereof. Suitable adhesive is disposed between the material of the connector pin 12 defining the aperture and the surface of the single fiber positioned in the aperture for securing the fiber to the connector pin. The end 12' of the connector pin from which the fiber protrudes is then precision ground thereby providing a planar surface including both the end of the connector pin and the end of the optical fiber mounted therein.

In another method of aligning the end of the fiber with the end of the connector pin, a portion of the protective jacket is stripped and the fiber is cleaned. The cut end of the fiber is aligned with the end of the connector pin, and the junction of the stripped and unstripped fiber is merely located within the larger diameter opening of the connector pin, as opposed to being pressed against the seat.

The type of adhesive used to bond the fiber to the connector pin depends upon the type of fiber being used. Where the single fiber is formed of a glass central core material and a glass cladding material, the adhesive should have an index of refraction greater than that of the material of the cladding so that optical power in the cladding dissipates as it passes through the connector. One suitable adhesive for this purpose is epoxy. Where the single fiber is formed of a glass central core material and a plastic cladding material, the adhesive material should have an index of refraction less than that of the glass core material. A preferred adhesive for this purpose is a silicon-based RTV adhesive material.

Figure 2:
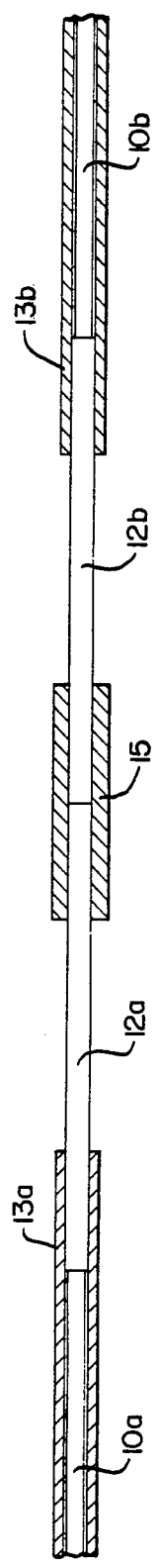
FIG. 2 is a schematic view partly in section of the general coupling arrangement by which alignment of a pair of connector pins is effected in accordance with the present invention.

Proper alignment between a pair of connector pins in accordance with the present invention is accomplished by use of an alignment sleeve 15 which is sized so as to hold a pair of connector pins in close axial alignment, as illustrated in FIG. 2. In this regard, a connector pin 12a into which an optical fiber 10a has been mounted in the manner described in connection with FIG. 1 and having a protective jacket 13a is inserted into one end of the alignment sleeve 15; while, a second connector pin 12b having an optical fiber 10b mounted therein and including a protective jacket 13b is inserted into opposite end of the alignment sleeve 15. Proper dimensioning of the aperture in the alignment sleeve 15 provides a simple means for effecting axial alignment between the respective connector pins, and therefore, proper alignment between the optical fibers mounted in the connector pins.

Figure 3:
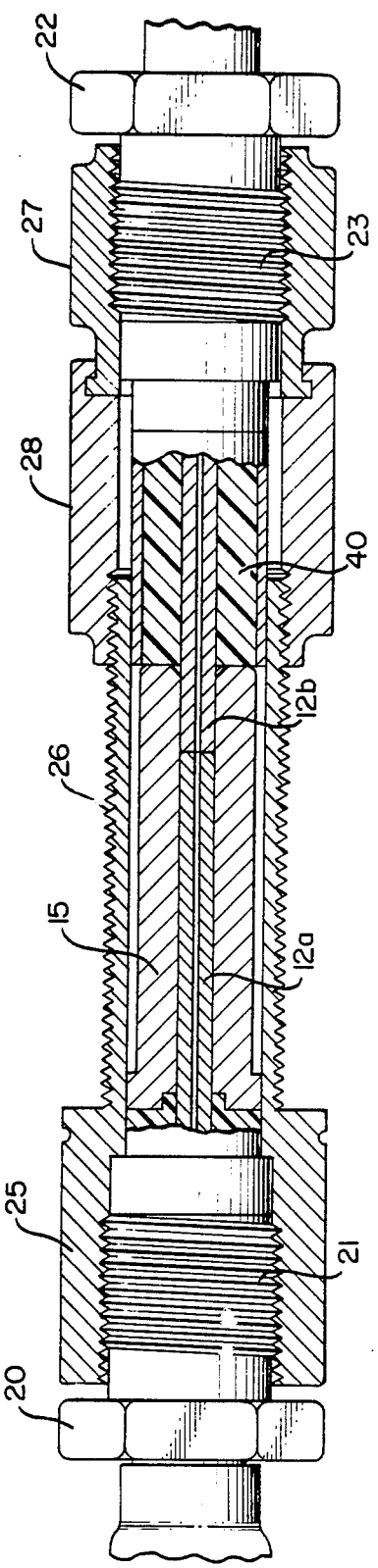
FIG. 3 is a longitudinal sectional view of an assembled optical fiber connector and coupling arrangement, showing the positions of both male and female connector portions, according to the present invention.

A coupling arrangement for the optical fiber connectors in accordance with the present invention is illustrated in FIG. 3. As seen in the figure, a first coupling member 20 having a threaded sleeve portion 21 is mounted on one end of a first connector pin 12a with the free end of the connector pin extending into one end of an alignment sleeve 15 carried thereby. A second coupling member 22 having a threaded sleeve portion 23 is mounted on one end of a second connecting pin 12b so that the free end of the connecting pin extends into the other end of the alignment sleeve 15 in abutting relationship with the connecting pin 12a. The connecting pins 12a and 12b are formed in the manner described in connection with FIG. 1 and alignment between these connecting pins is effected by means of the alignment sleeve 15 as described in connection with FIG. 2.

Associated with the coupling member 20 is a third coupling member in the form of a nut 25 having an internally threaded portion which engages the threaded sleeve member 21 of the coupling member 20 and has an externally threaded sleeve portion 26 extending over the alignment sleeve 15. Associated with the coupling member 22 is a fourth coupling member in the form of a threaded nut 27 which engages with the threaded sleeve portion 23 of the coupling member 22 and is also rotatably coupled to a further coupling member 28 having an internally threaded portion capable of engagement with the threaded sleeve portion 26 of the coupling member 25.

Thus, in the coupling arrangement illustrated in FIG. 3, the coupling member 25 is coupled to the coupling member 20 by threaded engagement while the coupling member 27 is coupled to the coupling member 22 by threaded engagement. Coupling between the members 25 and 27 is effected by threaded engagement between the coupling member 28 and the threaded sleeve portion 26 of the coupling member 25 to draw the connector pins 12a and 12b axially toward one another to effect contact between the end faces thereof and proper axial alignment as determined by the alignment sleeve 15. This coupling arrangement provides for simplified assembly and disassembly of the connection between the connector pins, and not only assures proper contact between the ends of the connector pins, but also proper alignment between the optical fibers carried thereby.

It will be noted that the connector pin-coupling arrangement for each of the pair of fibers to be coupled is identical in that the connector pins are identical and the coupling member 20 and 22 are identical. Thus, either connector may comprise the male or female portion and carry the alignment sleeve 15. In the example illustrated in FIG. 3, the alignment sleeve 15 is mounted on connector pin 12a and a spacing member 40 is mounted on connector pin 12b, but the elements 15 and 40 could be reversed with no effect, thereby providing very simplified assembly and disassembly of the arrangement facilitating fiber end cleaning in the field.

Figure 4:
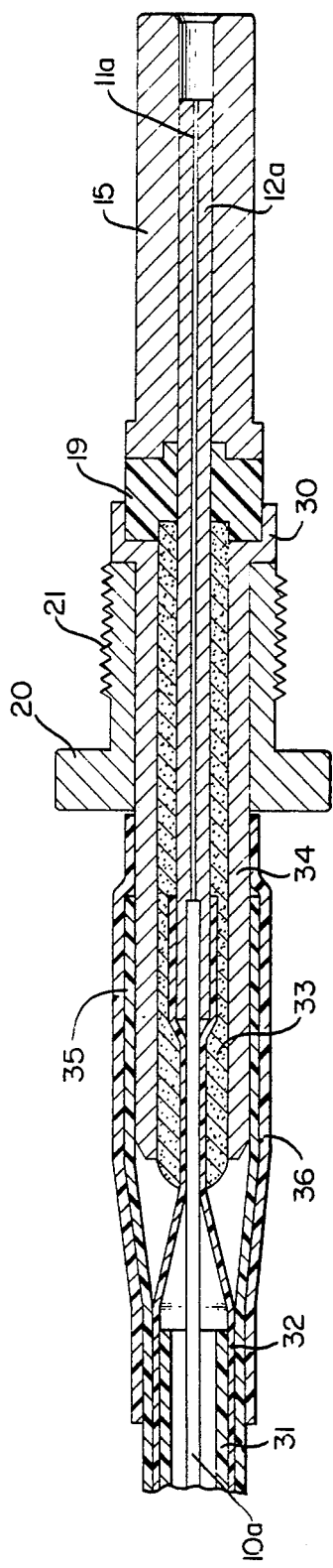
FIG. 4 is a longitudinal sectional view of the complete female connector portion, shown partially in FIG. 3.

The details of the female connector in accordance with the present invention are illustrated in FIG. 4. After the single fiber optic strand has been mounted in the connector pin 12a in the manner described in connection with FIG. 1, an insulating tubing 31, which may be formed of Teflon, is provided over the remaining fiber for protection and is attached to the connector pin 12a by means of a heat shrink tubing 32.

The optical fiber with the pin attached is then assembled into the connector back shell 34 made of a rigid material, such as metal, and is properly positioned inside the connector body using a tool that will ensure proper axial positioning of the optical fiber 10a. A flexible adhesive material 33, such as RTV adhesive, is then disposed in the region between the connector pin 12a and the metallic back shell 34 of the connector portion so as to maintain the connector pin in proper position while also providing a resilient base permitting slight movement of the pin 12a with respect to the connector shell 34. In this way proper axial alignment between the fibers is effected and maintained by the alignment sleeve 15 rather than the back shell 34. The fiber cable jacket 35 which is made of a material having high tensile strength and a low modulus of elasticity, such as fiberglass, is then bonded to the connector back shell 34 and a heat shrink tubing 36 is provided over the connection serving not only to seal the connection but also provide a strain relief therefor. Disposed between the alignment sleeve 15 and the female connector 20 is a bushing 19 made of flexible material, such as Teflon which also serves as an adhesive stop.

Figure 5:
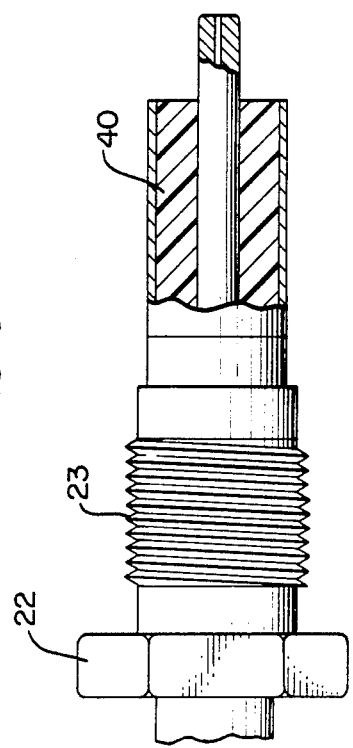
FIG. 5 is a partial sectional view of the male connector portion which is utilized in connection with the female connector portion illustrated in FIG. 4.

The male connector member in accordance with the present invention, as seen in FIG. 5, corresponds substantially identically to the female connector portion. In fact, either connector portion may be provided as the male or female connector with the alignment sleeve 15 being mounted on either one of the connector portions as indicated in conjunction with FIG. 3. In this regard, the spacing member 40 of insulating material, such as Teflon, and having a metallic sheath is provided on the male connector while the alignment sleeve 15 is provided on the female connector portion. In this way, the male and female connector portions may be constructed in an identical manner with only the disposition of the spacer member 40 and the alignment sleeve 15 determining which of the members is the male connector and which of the members is the female connector.

Loss tests have been made in connection with the connector and coupling arrangement illustrated in FIGS. 3-5, and performance results based on repeated connections wherein the connector was unmated, rotated, and remated provided an average transmission loss for all of the connections at 0.90 db, with measured loss as low as 0.60 db. Thus, the present invention provides for proper alignment of two optical fibers with extreme accuracy using connector and coupling means of simple construction providing for ease in mating and unmating a pair of optical fiber strands. The use of the stainless steel connector pin construction enables polishing of the fiber with ease and is also compatible with fiber ends that are cleaved prior to connector assembly.

The cable end of the connector assembly in accordance with the present invention is designed to perform three basic functions. First of all, the connector assembly provides for strain relief of the fiber as it emerges from the connector. It holds the fiber/coupler assembly in the correct position for proper mating, and the resilient adhesive provided between the connector pin and the connector back shell provides for flexing of the mated connector pins to ensure proper contact between the end surfaces thereof and satisfactory alignment within the alignment sleeve.

While I have shown and described an embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed is:

1. A connector for a single strand optical fiber comprising
   (a) a generally cylindrical connector pin made of a rigid material and being formed with an axially concentric precision circular aperture extending throughout the length of the pin, the aperture being shaped and sized to permit a stripped end of a single optical fiber to be snugly positioned within the aperture and bonded therein, the fiber being so positioned that the fiber end and one end of the said pin are co-planar;
   (b) a shell made of a rigid material enclosing a portion of the connector pin and having a back end extending beyond the other end of the connector pin;
   (c) a quantity of a flexible adhesive material disposed in at least a portion of the region between the connector pin and the shell for permitting slight movement of the connector pin with respect to the shell; and
   (d) means for connecting the shell to an unstripped fiber portion.

2. A connector according to claim 1 wherein the connecting means includes a flexible tube having a high tensile strength and low modulus of elasticity disposed around the unstripped fiber portion and being bonded to the back end of the shell.

3. A connector according to claim 2 wherein the shell has an outer threaded portion for engagement with a coupling means for coupling the connector to another connector.

4. A connector according to claim 2, further including an additional flexible tube within the flexible tube of high tensile strength and low modulus of elasticity and surrounding the unstripped fiber portion in spaced relation thereto and to the connector pin, and a heat deformable tube disposed around a portion of the connector pin and the additional flexible tube and being in heat deformed condition so as to form a flexible junction of the additional flexible tube and the connector pin with the optical fiber disposed therein.

5. A connector according to claim 1 wherein the connector pin is made of a metallic material.

6. A connector according to claim 5 wherein the connector pin is made of stainless steel.

7. A connector according to claim 1 wherein the connector pin is formed such that the aperture in one end of the pin has an enlarged opening extending a short distance so as to form an enclosure for the junction of the stripped and the unstripped portions of the optical fiber.

8. A connector according to claim 7 wherein the enlarged opening in the connector pin forms a seat for the junction of the stripped and unstripped portions of the optical fiber so that the junction is in contact with the end of the enlarged opening.

9. A coupling assembly for connecting the stripped ends of a pair of single optical fibers comprising
   (a) a pair of connectors each comprising a generally cylindrical connector pin made of a rigid material and being formed with an axially concentric precision circular aperture extending throughout the length of the pin, the aperture being shaped and sized to permit the stripped end of a single optical fiber to be snugly positioned within the aperture and bonded therein, the fiber being so positioned that the fiber end and one end of said pin are co-planar;
   (b) means for joining the pair of connectors such that the ends of the connector pins and the single optical fibers therein abut to form a junction; and
   (c) alignment means including an alignment sleeve disposed around the pair of connector pins so as to enclose said junction and portions of said pins on either side for maintaining linear alignment of the single optical fibers in each connector therebetween; and
   wherein said means for joining the pair of connectors includes a pair of connector shells each enclosing a portion of a respective connector pin and having a back end extending beyond the end of the connector pin opposite said junction, and a quantity of flexible adhesive material disposed in the region between each connector pin and the associated metallic shell for permitting slight movement of the connector pin with respect to the metallic shell.

10. A coupling assembly according to claim 9, wherein said means for joining the pair of connectors further includes coupling means secured to the connector shell of both connectors for drawing the connector pins into pressure contact, said flexible adhesive material in each connector resiliently biasing the connector pin held thereby towards the other of said connector pins so that a biased junction of the pair of optical fibers results.

11. A coupling assembly for connecting the stripped ends of a pair of single optical fibers comprising:
(a) a pair of connectors each comprising
   (1) a generally cylindrical connector pin made of a metallic material and being formed with an axially concentric precision circular aperture extending throughout the length of the pin, the aperture being shaped and sized to permit the stripped end of one of the single optical fibers to be snugly positioned within the aperture, the fiber being so positioned that the fiber end and one pin end are substantially coextensive;
   (2) adhesive means disposed between the material of the connector pin defining the aperture and the surface of the single fiber positioned in the aperture for securing the fiber to the connector pin;
   (3) a first flexible tube surrounding the unstripped fiber and having one end spaced from the other end of the connector pin,
   (4) a heat deformable tube disposed around a portion of the connector pin, the unstripped fiber adjacent the connector pin and the flexible tube and being in a heat deformed condition so as to form a flexible junction of the flexible tube and the connector pin with the fiber disposed therein;
   (5) a metallic shell enclosing a portion of the connector pin and having a back end extending beyond the other end of the connector pin;
   (6) a second flexible tube having high tensil strength tightly disposed over the back end of the metallic shell and extending along the heat deformed tube beyond the connector;
   (7) a quantity of a flexible adhesive material disposed in the region between the connector pin and the metallic shell for permitting slight movement of the pin with respect to the shell;
(b) the pair of connectors being joined such that the ends of the connector pins and the single fibers abut to form a junction of the pair of single fibers;
(c) an alignment sleeve made of a rigid material disposed around the pair of connector pins such as to enclose the junction thereof and the portions thereof on either side, the aperture of the alignment sleeve being shaped and sized so as to hold the connector pins in close axial alignment; and
(d) coupling means secured to the metallic shell of both connectors for drawing the connector pins into pressure contact, said flexible adhesive material in each connector providing a spring bias so that a biased junction of the pair of optical fibers results.

12. A coupling assembly according to claim 11, wherein said alignment sleeve is removably disposed around said pair of connector pins so as to permit simplified access to said connector pins and the optical fibers positioned therein.

13. The assembly according to claim 11 wherein the single fiber is formed of a glass central core material and a glass cladding material and wherein said adhesive means is an epoxy material having an index of refraction greater than that of the material of the cladding so that optical power in the cladding dissipates as it passes through the connector.

14. The assembly according to claim 11 wherein the single fiber is formed of a glass central core material and a plastic cladding material and wherein said adhesive means is an adhesive material having an index of refraction less than that of the glass central core material.

15. The assembly according to claim 11 wherein the connector pins are made of stainless steel.

16. The assembly according to claim 11 wherein said alignment sleeve is made of brass.

17. The assembly according to claim 11 wherein said alignment sleeve is made of a plastic material.

18. The assembly according to claim 15 wherein each connector pin is formed such that the aperture in one end of the pin has an enlarged opening extending a short distance so as to form an enclosure for the junction of the stripped and unstripped portions of the single optical fiber.

19. The assembly according to claim 11 further including a bushing made of a flexible material disposed between each end of said alignment sleeve and the respective end of the metallic sleeve.

20. The assembly according to claim 19 wherein the coupling means includes first and second coupling members threaded to the shell of a respective connector and having mating threaded portions for engagement with one another.

21. A single fiber connector assembly comprising
 (a) a single fiber whose end is stripped of a protective jacket;
 (b) a connector pin made of a metallic material and being formed with an axially aligned circular aperture extending throughout the length thereof, the stripped end of the single fiber being positioned in the aperture such that ends of the fiber and the pin lie on a common plane, the diameter of the aperture being slightly greater than the diameter of the fiber;
 (c) a quantity of first adhesive material disposed between the inner walls of the connector pin and the fiber to hold the fiber secure with respect to the pin;
 (d) a Teflon tube surrounding the remaining portion of the stripped fiber for protection of the fiber;
 (e) means for attaching the tube to the end of the connector pin;
 (f) a connector body having an axially aligned aperture, the connector pin and attached fiber being located in spaced relationship within said aperture;
 (g) means comprising a resilient adhesive material disposed in the space between said pin and said connector body for holding the pin within the connector body; and
 (h) a metallic alignment tube having an axial aperture of uniform central circular diameter slightly larger than the outer diameter of the connector pin, the end of the pin being positioned in the alignment tube such that one end thereof is flush with the end of the connector body, the tube having a length such that the connector pin end does not protrude through the end thereof and thereby is adapted to receive a similar pin of another connector assembly to be adjoined thereto.

22. A coupling assembly according to claim 21, wherein said alignment sleeve is removably disposed around said connector pin so as to permit simplified access to said connector pin and said single fiber positioned therein.

23. The connector assembly according to claim 21 wherein the first adhesive material is epoxy.

24. The connector assembly according to claim 21 wherein the first adhesive material is silicon based RTV.

25. The connector assembly according to claim 21 wherein the aperture in the connector pin is formed with an enlarged region at one end thereof.

26. The connector assembly according to claim 21 further including a resilient bushing disposed between said connector body and said alignment tube to act as an adhesive stop.

27. The connector assembly according to claim 21 wherein said resilient adhesive material is an RTV adhesive material.

28. The connector assembly according to claim 21 wherein the connector pin is made of stainless steel tubing.

29. The connector assembly according to claim 21 wherein the adhesive means includes means for providing loading on the mated pin.

30. A coupling assembly for connecting the stripped ends of a pair of single optical fibers comprising
 (a) a pair of connectors each comprising a generally cylindrical connector pin made of a rigid material and being formed with an axially concentric precision circular aperture extending throughout the length of the pin, the aperture being shaped and sized to permit the stripped end of a single optical fiber to be snugly positioned within the aperture and bonded therein, the fiber being so positioned that the fiber end and one end of said pin are co-planar;
 (b) means for joining the pair of connectors such that the ends of the connector pins and the single optical fibers therein abut to form a junction;
 (c) alignment means including an alignment sleeve disposed around the pair of connector pins so as to enclose said junction and portions of said pins on either side for maintaining linear alignment of the single optical fibers in each connector; and
 (d) said means for joining the pair of connectors includes a pair of rigid connector shells each enclosing a portion of a respective connector pin and having a back end extending beyond the end of the connector pin opposite said junction, and a quantity of flexible adhesive material disposed in the region between each connector pin and the associated shell for permitting slight movement of the connector pin with respect to the shell, the adhesive material providing a spring bias so that a biased junction of the pair of optical fibers results.

31. A coupling assembly according to claim 30, wherein said alignment sleeve is removably disposed around said pair of connector pins so as to permit simplified access to said connector pins and the optical fibers positioned therein.

32. The coupling assembly according to claim 30 further including said adhesive material being effective to release the connector pin from its engagement with the shell when excessive forces are created such by the pressure of foreign objects and the like disposed between the ends of the connector pins, thereby minimizing damage to the components forming the coupling assembly.

* * * * *